United States Patent [19]
Andreotti

[11] 3,926,522
[45] Dec. 16, 1975

[54] FAR-INFRARED RADIANT INTENSITY METER

[75] Inventor: John R. Andreotti, Silver Spring, Md.

[73] Assignee: The United States of America as represented by the Secretary of the Navy, Washington, D.C.

[22] Filed: Nov. 27, 1973

[21] Appl. No.: 419,316

[52] U.S. Cl. .................. 356/51; 250/338; 356/186; 356/188
[51] Int. Cl.² ........................................ G01N 21/34
[58] Field of Search ...... 356/51, 186, 188; 250/216, 250/338

[56] References Cited
UNITED STATES PATENTS

| 3,405,268 | 10/1968 | Brunton | 356/51 |
| 3,749,495 | 7/1973 | Wilkins et al. | 356/51 |

*Primary Examiner*—Vincent P. McGraw

[57] ABSTRACT

An electro-optical apparatus useful in measuring the radiant intensity of medium to high intensity radiation sources in the 3 to 5 and 8 to 13 micron spectrum.

2 Claims, 6 Drawing Figures

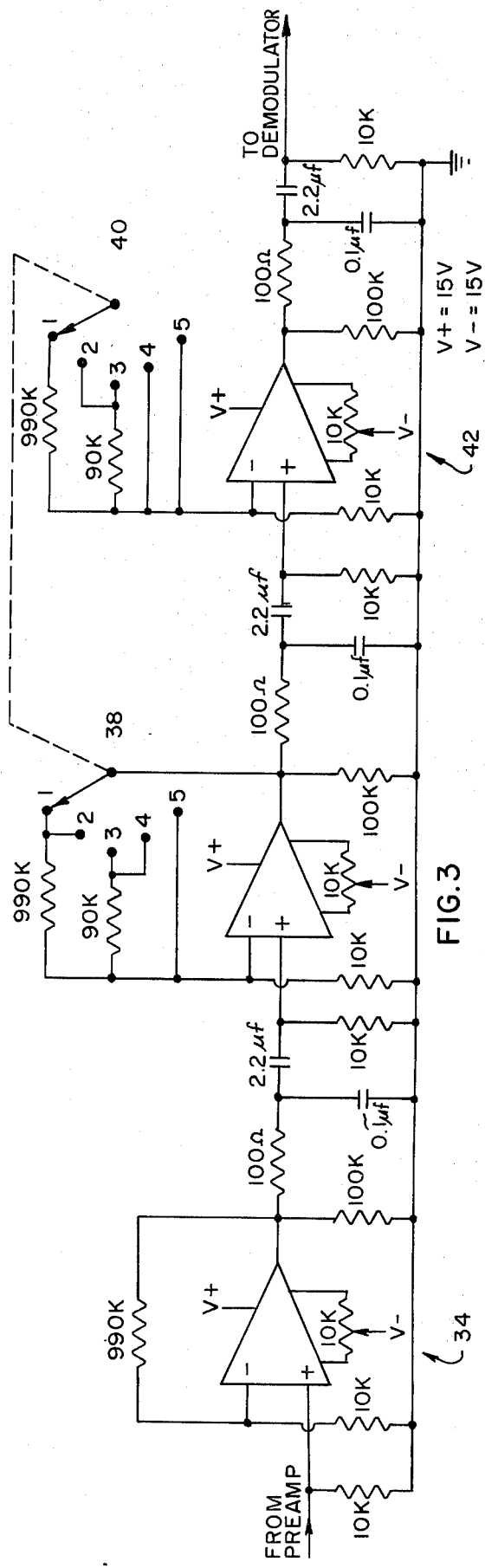
FIG. 3
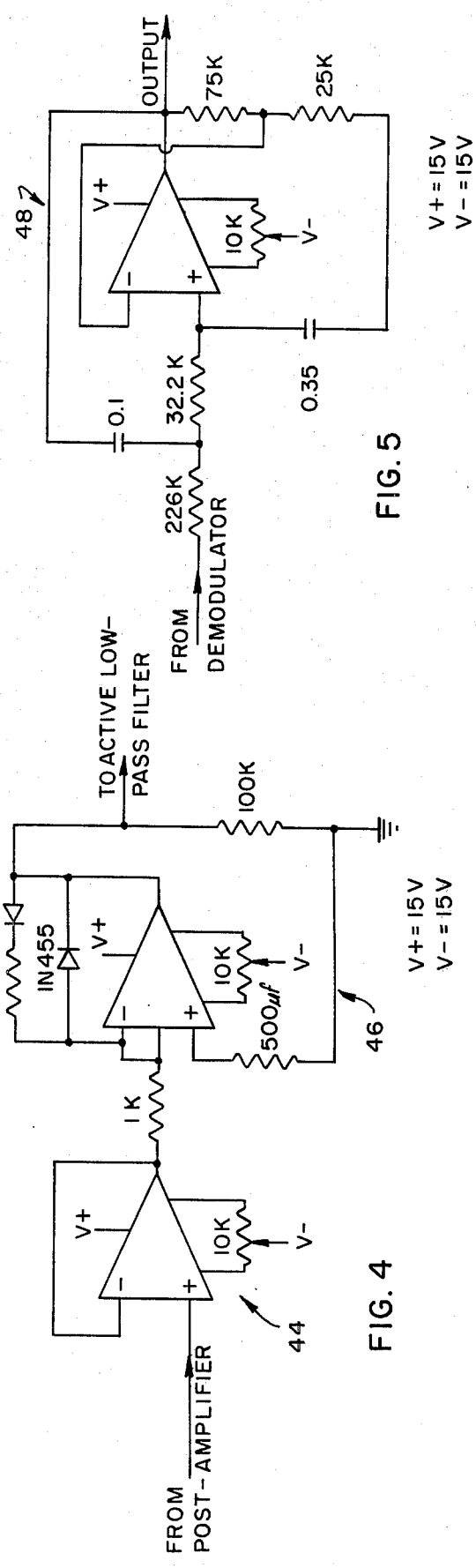
FIG. 5
FIG. 4

FAR-INFRARED RADIANT INTENSITY METER

BACKGROUND OF THE INVENTION

The present invention relates generally to radiant energy and more specifically to devices for detection and measurement of infrared rays associated with hydrocarbon and exotic fuels and flares.

Presently there is no known equipment available that can readily measure the radiant intensity of hydrocarbon and exotic fuels in the 3 to 5 and 8 to 13 micron spectral region. When commercial radiometers were used for this purpose it was found that they suffered from one or more of the following defects:

a. the instruments did not have a sufficiently wide, flat, response field of view;

b. the overall response of the system was not flat in the spectral region of interest;

c. the responsivity was too low;

d. the response time was too long;

e. the instrumentation drifts were excessive at higher gains.

SUMMARY OF THE INVENTION

The present invention overcomes the disadvantages and limitations of the prior art by providing apparatus for measuring radiant intensity of medium to high intensity radiation sources in the 3–5 and 8–13 micron spectrum comprising a bandpass filter, pyroelectric detector, amplifier, demodulator filter and recorder.

It is therefore an object of the present invention to provide a new and improved far infrared radiant intensity meter.

It is also an object of the invention to provide a device for measuring far infrared radiation which has a wide, flat, response field of view.

Another object of the invention is to provide a device for measuring radiation which has a strong response.

Another object of the invention is to provide a device for measuring far infrared radiation which has a short response time.

Another object of the invention is to provide a device for measuring far infrared radiation which is stable at higher gains.

Other objects, advantages and novel features of the invention will become apparent from the following detailed description of the invention when considered in conjunction with the accompanying drawings wherein:

BRIEF DESCRIPTION OF THE DRAWINGS

FIG. 3 is a detailed diagram of the electronics of the post amplifier stage of the preferred embodiment.

FIG. 4 is a detailed diagram of the electronics of the demodulator stage of the preferred embodiment.

FIG. 5 is a diagram of the electronics of low pass filter stage of the preferred embodiment.

DESCRIPTION OF THE PREFERRED EMBODIMENT

Figure 1:
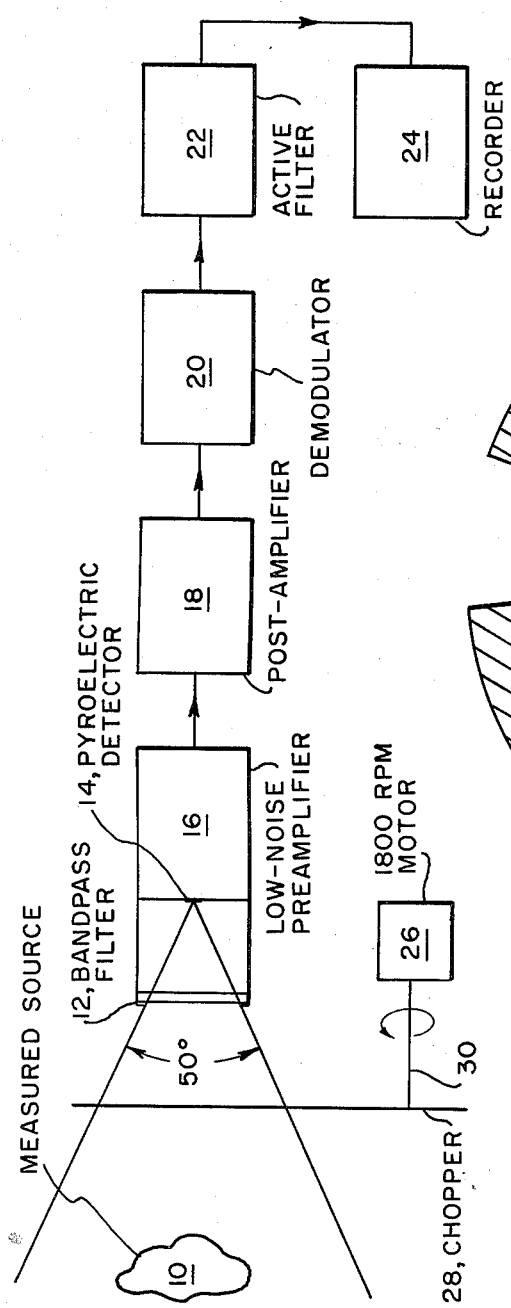
FIG. 1 is a block diagram of the preferred embodiment.

FIG. 1 is a block diagram of the preferred embodiment showing only a single channel of the device. The complete apparatus consists of three similar channels, the only difference being in the optical band-pass filters of the three channels used, one measures the radiant intensity in the 8 to 13 micron region and two measure the radiant intensity in the three-to-five micron region so as to notch out the 4.1-4.4 micron region.

Figure 2:
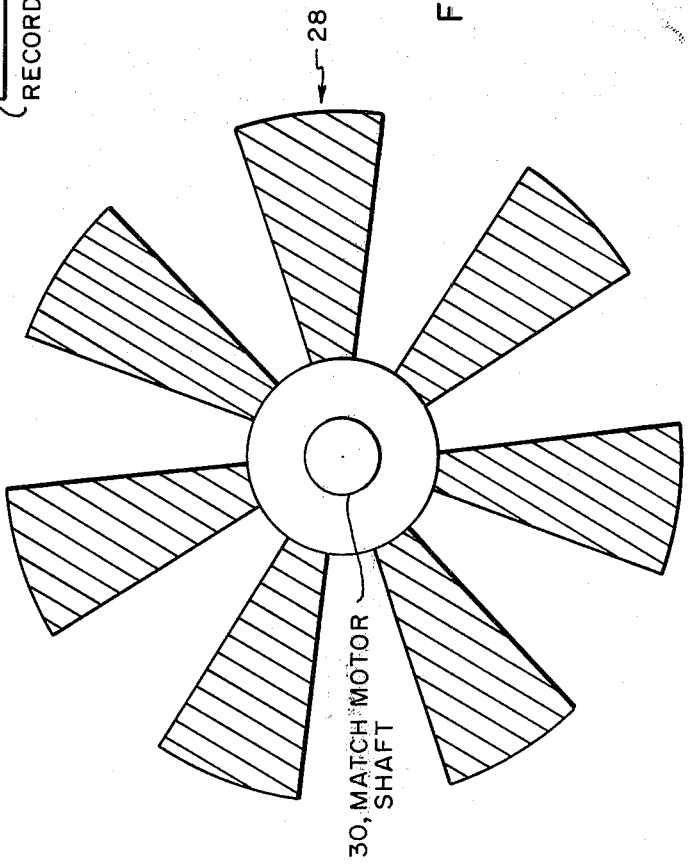
FIG. 2 is a diagram of the radiation chopper employed by the present invention.

As shown in FIG. 1, the instrument is initially viewing the source background. The source 10 is then introduced into the field of view. This results in a change in irradiance, at the detector 14, above the background value. The chopper 28, shown more clearly in FIG. 2 interrupts this irradiance at a rate of 210 Hz. This signal is picked up by the detector 14 and preamplifier 16 combination which together convert the chopped irradiance to an electrical signal. The signal is then amplified by the post-amplifier 18. Gang switches 38 and 40 of FIG. 3 enable the operator to vary the gain from 100 to $10^6$ in precise decade steps. The amplified signal is then demodulated by demodulator 20 which also shown in FIG. 4 and filtered by active filter 22 also shown in FIG. 5 to give a signal which is the time analog of the increase in the irradiance at the detector above the background value. From this information the radiant intensity of the source 10 may be easily calculated, assuming the distance between the source 10 and detector 14 is known. The latter assumes a source of large radiant contrast to its background. This is the case for the intended measurements.

More detailed diagrams of the electronics embodied in the block diagram of FIG. 1 is shown in FIGS. 3 to 5.

FIG. 3 is a circuit diagram of a conventional post amplifier 18 of FIG. 1 utilizing three stages of amplification by standard operational amplifiers having feedback networks.

FIG. 4 is a circuit diagram of the demodulator 20 which also utilizes conventional operational amplifiers with nonlinear elements used in the feedback path to demodulate the information signal.

FIG. 5 is a circuit diagram of the low pass filter stage 22 of FIG. 1. It again utilizes a conventional operational amplifier to actively filter the low frequency signals. The main advantage of the subject invention over commercial radiometers stems from the elimination of refractive and reflective optics. This makes possible the construction of an instrument with a wide and flat field of view having a conical shape as shown in FIG. 1 with an apex angle of not less than 50° and a spectrally flat response in its spectral passband. The elimination of optics is in turn made possible by the elimination of the reference blackbody usually used with radiometers. Sacrificed however, is the ability to measure absolute radiance. Yet, when measuring the radiant intensity (or radiance) of an object of large contrast above background, the need to measure absolute values does not exist. Therefore, by sacrificing a convenience which, for the purpose of the measurements described above, amounts to a superfluous luxury, a very solid advantage is gained.

Also, this device makes possible the measurement of radiant intensity of an heterogeneous, non-gray source over a specified range of spectral wave band. These are the main features required of, but not found in, conventional equipment.

Other advantages of the device are its ability to: (a) operate under field conditions with temperatures ranging from −20°C to 55°C; (b) measure total radiant intensity in three different spectral bands; and, (c) interpret data since its output voltage is directly proportional to the radiant intensity being measured. This voltage may be recorded on a chart recorder for on the spot interpretation and/or on a tape recorder for storage and more extensive analysis.

Figure 6:
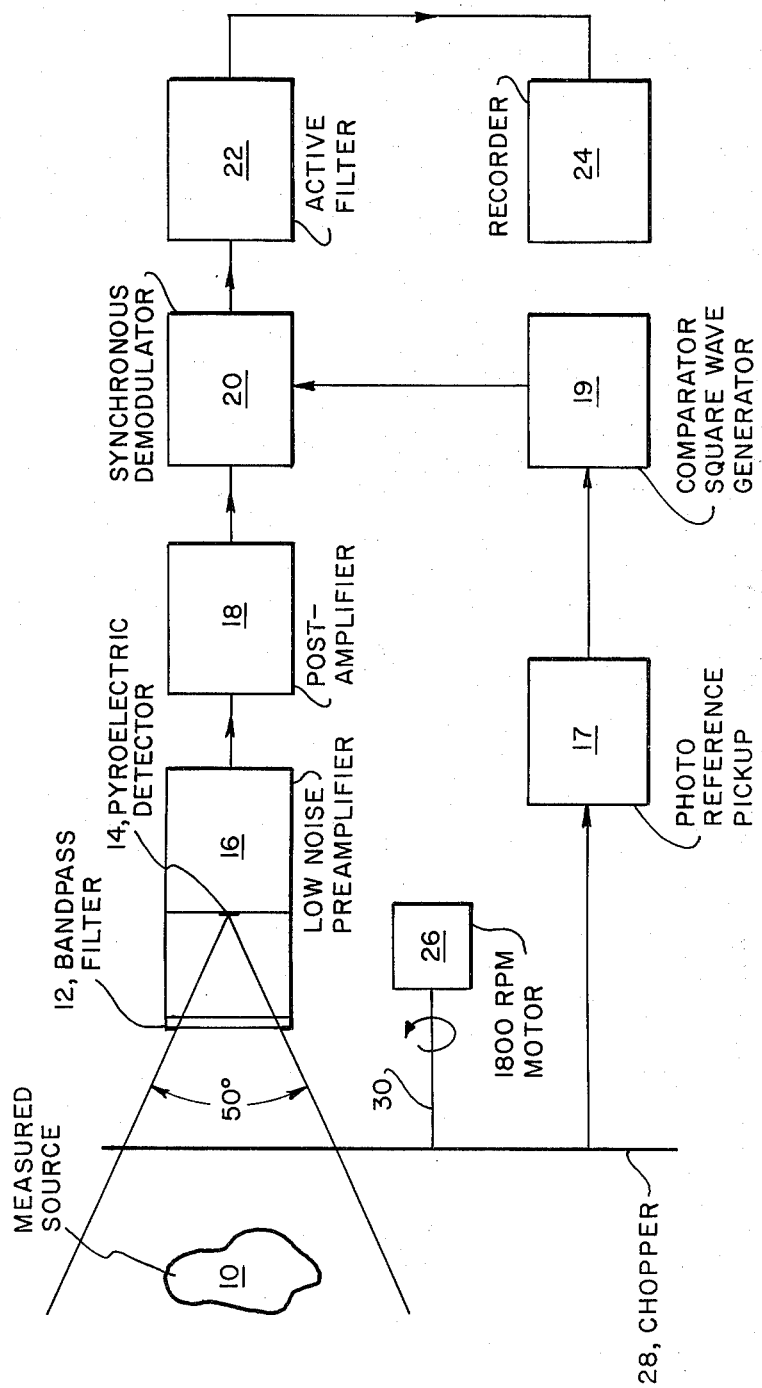
FIG. 6 is a diagram of an alternative embodiment.

Obviously many modifications and variations of the present invention are possible in light of the above teachings. For example, although this instrument was developed specifically for radiant intensity measurements in the 3 to 5 and 8 to 13 micron spectral range, it can easily be adapted to measurements in any wave band from one-tenth to twenty microns. This can be done by replacing the band-pass filters in the detectors. The only restriction would be that of obtaining the proper filter. This might be a problem if the wave band chosen were unreasonably large. Also, synchronous demodulation may be used as shown in FIG. 6.

It is therefore to be understood that within the scope of the appended claims the invention may be practiced otherwise than as specifically described.

What is claimed as new and desired to be secured by Letters Patent of the United States is:

1. A radiometer for measuring the entire infrared radiation response of a black body source for a narrow band of infrared frequencies at short range comprising:
    means for modulating said infrared radiation;
    optical filter means mounted in an aperture of a sensing device for passing said infrared radiation through said aperture having a frequency response falling in a narrow band of frequencies in the infrared spectrum;
    pyroelectric detection means mounted in said sensing means behind said aperture for sensing said infrared radiation over a conical field of view having an apex angle of not less than 50° to produce an electrical signal representative of a uniform response of said pyroelectric detection means over said conical field of view;
    means for variably amplifying said electrical signal;
    nonlinear feedback means for demodulating said electrical signal;
    active electronic means for filtering said electrical signal;
    means for recording said electrical signal to detect its magnitude which is indicative of the intensity of said infrared radiation.

2. The device of claim 1 wherein said means for modulating comprises a chopper.

* * * * *